United States Patent [19]
Andrews

[11] Patent Number: 5,983,156
[45] Date of Patent: Nov. 9, 1999

[54] SYSTEM FOR CONTROLLING ENGINE FUELING ACCORDING TO VEHICLE LOCATION

[75] Inventor: Eric B. Andrews, Gerrards Cross, United Kingdom

[73] Assignee: Cummins Engine Company, Columbus, Ind.

[21] Appl. No.: 08/922,961

[22] Filed: Sep. 3, 1997

[51] Int. Cl.$^6$ .............................. G06F 19/00; B60T 7/18; F02M 51/00

[52] U.S. Cl. .......................... 701/115; 701/207; 701/213; 701/217; 701/218; 180/167

[58] Field of Search .................................. 123/436, 486; 180/167, 168, 169; 701/1, 2, 25, 103, 104, 105, 115, 207, 213, 215, 218, 219; 340/438, 439, 459, 825.3, 825.31, 425.5; 307/9.1, 10.1, 10.4, 10.5

[56] References Cited

U.S. PATENT DOCUMENTS

| | | | |
|---|---|---|---|
| 3,824,534 | 7/1974 | Straumsnes | 340/996 |
| 4,368,705 | 1/1983 | Stevenson et al. | 123/357 |
| 4,785,463 | 11/1988 | Janc et al. | 375/206 |
| 4,791,572 | 12/1988 | Green, III et al. | 701/207 |
| 5,014,206 | 5/1991 | Scribner et al. | 701/207 |
| 5,027,302 | 6/1991 | Asanuma et al. | 701/48 |
| 5,247,440 | 9/1993 | Capurka et al. | 701/49 |
| 5,268,842 | 12/1993 | Marston et al. | 701/105 |
| 5,284,116 | 2/1994 | Richeson, Jr. | 701/115 |
| 5,293,317 | 3/1994 | Adrain et al. | 701/115 |
| 5,315,295 | 5/1994 | Fujii | 180/167 |
| 5,359,528 | 10/1994 | Haendel et al. | 701/35 |
| 5,445,128 | 8/1995 | Letang et al. | 123/436 |
| 5,531,200 | 7/1996 | Hosoe et al. | 701/115 |
| 5,561,602 | 10/1996 | Bessler et al. | 701/1 |
| 5,562,336 | 10/1996 | Gotou | 362/466 |
| 5,638,790 | 6/1997 | Minowa et al. | 123/436 |
| 5,749,346 | 5/1998 | Halvorson et al. | 123/486 |
| 5,769,051 | 6/1998 | Bayron et al. | 180/167 |
| 5,884,210 | 3/1999 | Rettig et al. | 701/115 |

Primary Examiner—Willis R. Wolfe
Attorney, Agent, or Firm—Beck, Michael & Beck, P.C.

[57] ABSTRACT

A system for controlling fueling of an internal combustion engine includes a receiver associated with the vehicle, such as a GPS, GLONASS or LORAN-C receiver, operable to receive radio signals relating to vehicle location, a fueling system responsive to fueling signals to provide fuel to the engine and a control computer with a memory having a number of different engine fueling maps stored therein. The control computer is responsive to the radio signals to determine therefrom a geographical position of the vehicle, retrieve an appropriate one of the number of engine fueling maps from memory which corresponds to the geographical location of the vehicle, and provide the fueling signals according to the appropriate one of the number of engine fueling maps. In an alternative embodiment, the system includes a communications transceiver operable to transmit either the radio signals or the geographical location of the vehicle to a remote computer system, wherein the remote computer system is operable to determine an appropriate engine fueling map, based on the geographical location of the vehicle, and transmit the engine fueling map information back to the control computer for fueling the engine in accordance therewith. In either embodiment, engine fueling maps corresponding to at least a low emissions fueling mode, a fuel economic fueling mode and a high engine output fueling mode are provided for fueling the engine when the vehicle is located in an urban, rural and hilly geographical location respectively.

30 Claims, 5 Drawing Sheets

SYSTEM FOR CONTROLLING ENGINE FUELING ACCORDING TO VEHICLE LOCATION

FIELD OF THE INVENTION

The present invention relates generally to systems and techniques for controlling fueling of an internal combustion engine, and more specifically to systems controlling engine fueling in accordance with information relating to vehicle location.

BACKGROUND OF THE INVENTION

It is presently known in the internal combustion engine industry, and particularly in the medium and heavy duty truck industry, to select engine fueling strategies based on presumed geographic conditions, wherein the geographic conditions are presumed from certain engine and/or vehicle operational parameters. In one known system, engine acceleration is monitored, presumed geographic conditions are determined therefrom and an appropriate one of a pair of fueling strategies is selected based upon the presumed geographic conditions. For example, during periods of continuous accelerations (i.e. stop and go traffic), the vehicle is presumed to be operating in or near a city, and a low emissions engine fueling map is selected for operation in accordance therewith. Conversely, during periods of steady state engine operation, the vehicle is presumed to be operating on an open highway, and a fuel economic engine fueling map is selected for operation in accordance therewith.

While engine fueling control systems of the foregoing type have been somewhat helpful in reducing emissions in areas designated by the Environmental Protection Agency (EPA) as non-attainment areas, they have several drawbacks associated therewith. For example, due to the engine acceleration-based determination of presumed geographic conditions, the foregoing system will typically select the fuel economic engine fueling map when driving on city freeways and beltways, thereby increasing vehicle emissions in or near low emissions urban areas.

As another example drawback, engine fueling control systems of the foregoing type typically switch to the fuel economic engine fueling map only after prolonged periods of steady state engine operation. Thus, during stops in rural areas, such as at weigh stations and toll booths, such systems typically revert back to the low emissions fueling map. The same result occurs when the vehicle is in operation and the vehicle operator is required to interrupt steady state engine operation, such as when downshifting to negotiate a steep grade or when slowing down the vehicle in construction areas. In either case, fuel economy unnecessarily deteriorates.

As yet another drawback, known engine fueling control systems of the foregoing type provide for selection between only a fuel economic or a low emissions engine fueling map. However, either engine fueling map may be undesirable, or even counterproductive, under certain conditions requiring increased engine output (either via engine output power or engine output torque), such as when climbing steep grades. Increased engine output under such conditions would be advantageous in several respects. For example, vehicle operators would be grateful for increased engine output when driving through mountainous regions, and such increased output would reduce the need to down-shift, thereby reducing wear and tear on vehicle components. Moreover, such increased output would likely decrease transit time and allow vehicle operators to pass similarly rated vehicles while still maintaining good fuel economy. Further, vehicle purchasers could purchase lower rated engines and still get higher engine output when needed. The lower rated engines would resultantly last longer than the higher rated predecessor engines, and customer satisfaction would likely correspondingly increase.

What is therefore needed is a system for controlling engine fueling which overcomes the drawbacks of known engine fueling control systems. Ideally, such a system should control engine fueling based on actual (or somewhat accurately estimated) vehicle location/position. Such a system could dramatically reduce emissions in low emissions areas and more accurately enable an appropriate engine fueling map regardless of the states, trends or statuses of engine/vehicle operational parameters. Such a system should further make available not only fuel economic and low emissions engine fueling maps, but should further provide for one or more higher output engine fueling maps to assist vehicle operators in hilly or mountainous regions.

SUMMARY OF THE INVENTION

The foregoing shortcomings of the prior art are addressed by the present invention. In accordance with one aspect of the present invention, a system for controlling fueling of an internal combustion engine of a vehicle according to vehicle location comprises a receiver associated with a vehicle for receiving radio signals relating to vehicle location, a fueling system responsive to a fueling signal to provide fuel to an internal combustion engine of the vehicle, means responsive to the radio signals relating to vehicle location for determining a geographical location of the vehicle, means responsive to the geographical location of the vehicle for determining an engine fueling map corresponding to the geographical location of the vehicle, and a control computer providing the fueling signal to the fueling system according to the engine fueling map.

In accordance with another aspect of the present invention, a system for controlling fueling of an internal combustion engine of a vehicle according to vehicle location comprises a receiver associated with a vehicle for receiving radio signals relating to vehicle location, a fueling system responsive to a fueling signal to provide fuel to an internal combustion engine of the vehicle, a memory unit having a number of different engine fueling maps stored therein, and a control computer connected to the receiver, the fueling system and the memory unit. The control computer is responsive to the radio signals relating to vehicle location to determine therefrom a geographical location of the vehicle, retrieve from the memory unit an appropriate one of the engine fueling maps corresponding to the geographical location of the vehicle, and provide the fueling signal to the fueling system according to the appropriate one of the number of engine fueling maps.

In accordance with a further aspect of the present invention, a method of controlling fueling of an internal combustion engine according to vehicle location comprises the steps of determining a geographical location of a vehicle having an internal combustion engine, determining an appropriate engine fueling map corresponding to the geographical location of the vehicle, and fueling the engine according to the appropriate engine fueling map.

One object of the present invention is to provide a system for providing an internal combustion engine with a fueling map appropriate for a current location of the vehicle carrying the engine.

Another object of the present invention is to provide such a system including a memory unit having a number of engine fueling maps stored therein, wherein the system further includes a vehicle location determining unit and a control computer operable to retrieve an appropriate one of the number of engine fueling maps for the current geographical location of the vehicle.

A further object of the present invention is to provide such a system alternatively including a communications unit operable to communicate with a remote communications unit to receive either an appropriate engine fueling map therefrom or instructions therefrom to retrieve an appropriate engine fueling map from the memory unit.

Yet another object of the present invention is to provide such a system wherein the number of engine fueling maps includes at least a low emissions engine fueling map, a fuel economy engine fueling map and a high engine output engine fueling map.

Still another object of the present invention is to provide such a system wherein the low emissions engine fueling map is selected when the vehicle is operating in an urban geographical area, the fuel economy engine fueling map is selected when the vehicle is operating in a rural geographical area and the high engine output engine fueling map is selected when the vehicle is operating in a geographical area having inclined road grades.

These and other objects of the present invention will become more apparent from the following description of the preferred embodiments.

DESCRIPTION OF THE PREFERRED EMBODIMENTS

Figure 1:
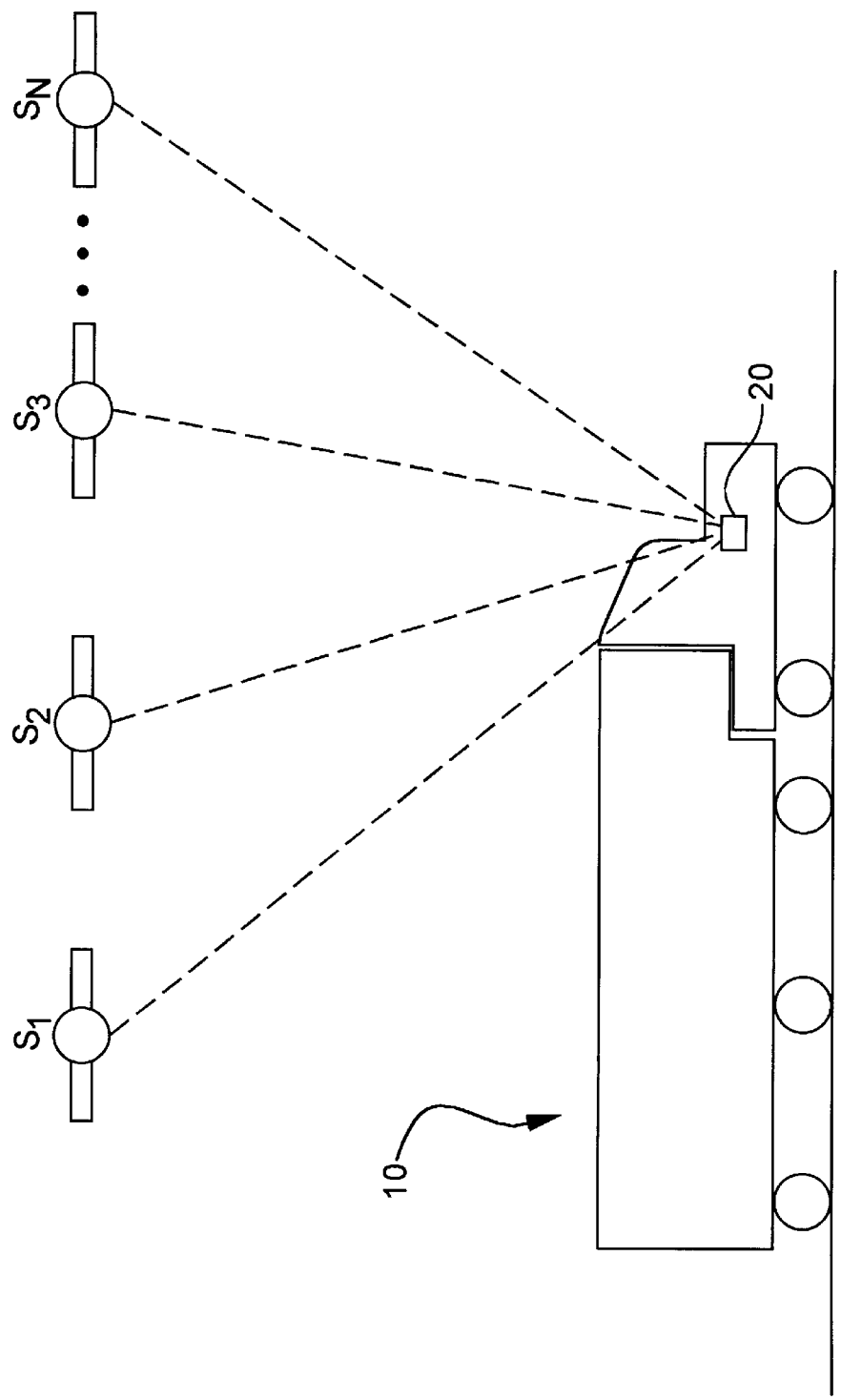
FIG. 1 is a diagrammatic illustration of a motor vehicle equipped with a receiver for receiving geographical position/location information, in accordance with one aspect of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring to FIG. 1, a motor vehicle 10, such as a tractor truck-trailer combination, is shown including a vehicle position receiver 20 for receiving radio frequency signals indicative of vehicle position, in accordance with the present invention. In a preferred embodiment, vehicle position receiver 20 is a known Global Position Satellite (GPS) signal receiver operable to receive GPS signals broadcast by a number n of earth orbiting satellites $S_1$–$S_n$. Presently, 24 such earth orbiting satellites $S_1$–$S_{24}$ are in orbit above North America, wherein each satellite continuously broadcasts radio frequency signals, and wherein the satellites are arranged relative to each other such that at signals from at least three satellites are detectable anywhere in North America. In accordance with known GPS technology, the radio signals from at least three such satellites may be received and processed by known GPS receiving systems to determine the present geographical coordinates of the system with a high degree of accuracy.

A similar satellite-based system, GLONAS, is also currently in place over Russia and much of western Europe and operates in a substantially similar manner to the GPS system. Thus, while vehicle position receiver 20 is shown and described above as a GPS receiver, those skilled in the art will recognize that receiver 20 may alternatively be a known GLONAS receiver operable to receive GLONAS position signals broadcast by GLONAS satellites. In another alternative embodiment, vehicle position receiver 20 may be a known LORAN-C receiver operable to receive LORAN-C signals from a LORAN-C based position system as is known in the art. As it relates to the present invention, however, those skilled in the art will appreciate that position signal receiver 20 may be any receiver operable to receive broadcast signals from a suitable broadcast system and from which present vehicle position may be computed or estimated in accordance with known techniques.

Figure 2:
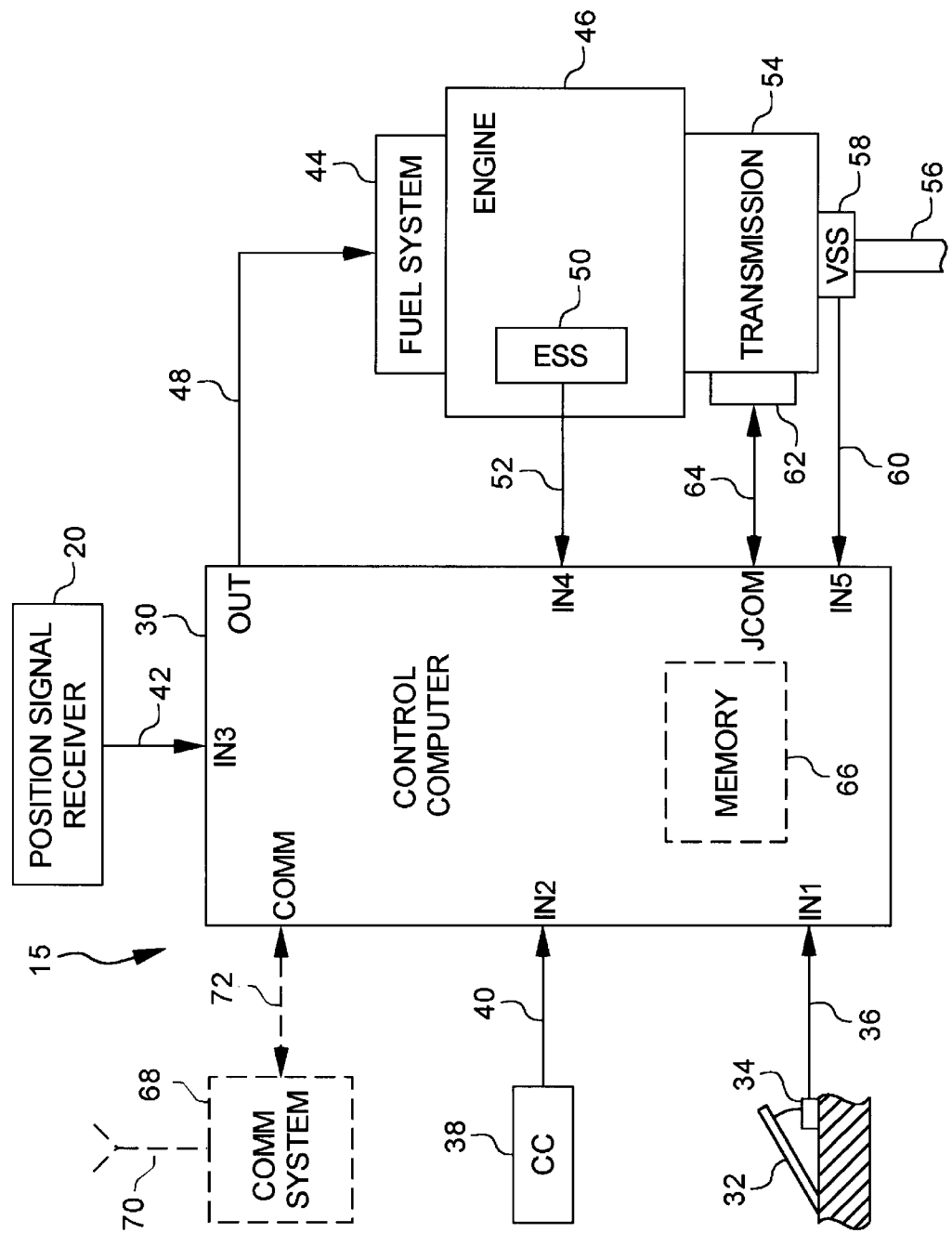
FIG. 2 is a diagrammatic illustration of one preferred embodiment of an engine control system for controlling engine fueling according to vehicle location, in accordance with another aspect of the present invention.

Referring now to FIG. 2, an internal combustion engine control system 15 is shown connected to the vehicle position signal receiver 20, and is operable to determine an appropriate engine fueling map corresponding to current vehicle location, in accordance with the present invention. As used herein, the term "engine fueling map" includes any mathematical function, table of values or the like mapping engine fueling requests to appropriate fuel quantities, fuel injection timing, and the like. Central to system 15 is a control computer 30 which has an input IN3 connected to vehicle position signal receiver 20 via signal path 42, and further interfaces with various motor vehicle components as will be described more fully hereinafter. Control computer 30 is preferably microprocessor-based and includes a memory 66, digital I/O, a number of analog-to-digital (A/D) inputs at least one communications port (COMM) such as a DUART.

The microprocessor portion of control computer 30 runs software routines an manages the overall operation of system 15 and is, in one embodiment, a Motorolla 68336 or equivalent microprocessor. However, the present invention contemplates using any one of a number of known microprocessors capable of managing and controlling system 15.

The memory portion 66 of control computer 30 may include ROM, RAM, EPROM, EEPROM, FLASH MEMORY and/or any other reusable type of memory known to those skilled in the art. Memory 66 may further be supplemented by external memory connected thereto (not shown).

System 15 further includes a cab-mounted accelerator pedal 32 which includes a sensor 34 operable to produce an accelerator signal indicative of accelerator pedal deflection, which signal is provided to input IN1 of control computer 30 via signal path 36. In one embodiment, sensor 34 is a potentiometer producing a dc voltage level on signal path 34 indicative of accelerator pedal position or deflection, although the present invention contemplates that other known sensors may be alternatively associated with accelerator pedal 32 to provide an analog or digital signal or signals corresponding to accelerator pedal position or pressure applied to accelerator pedal 32. In any event, such the accelerator signal or signals on signal path 34 is/are processed by control computer 30, as is known in the art, to determine a quantity indicative of driver requested torque.

System 15 further includes a known cruise control system 38 connected to input IN2 of control computer 30 via signal path 40. As is known in the art, control computer 30 is responsive to one or more cruise control signals provided on signal path 40 when cruise control system 38 is active to determine a quantity indicative of cruise control requested torque. As is known in the art, control computer 30 is responsive to the driver requested torque and cruise control torque quantities, as well as other engine and vehicle related parameters, to determine engine fueling rates from an engine fueling map stored in memory 66.

System 15 further includes an known engine fueling system 44 operatively associated with an internal combustion engine 46 of vehicle 10, and connected to output OUT of control computer 30 via signal path 48. Engine 46 includes an engine speed and/or position sensor 50 which is connected to input IN4 of control computer 30 via signal path 52. Engine speed sensor 46 is preferably a Hall Effect device operable to sense speed and/or position of a toothed gear rotating synchronously with the engine crank shaft. However, the present invention contemplates that engine speed sensor 50 may be any other known sensor, such as a variable reluctance sensor for example, operable to sense engine rotational speed and provide an engine speed signal to control computer 30 via signal path 52 corresponding thereto. Control computer 30 and engine speed sensor 50 comprise a known closed-loop control system whereby control computer is responsive to torque request signals provided by accelerator pedal 26 and/or cruise control system 38, the engine speed signal provided on signal path 52 and other known signals, to process such signals in accordance with an engine fueling map stored in memory 66 and provide an engine fueling signal corresponding thereto to fuel system 44 via signal path 48. Preferably, known closed-loop control techniques, such as proportional-integral-derivative (PID) techniques and the like, are used to produce the engine fueling signal provided on signal path 48.

System 15 further includes a transmission 54 operatively connected to engine 46 as is known in the art, wherein transmission 54 may be a manual, automatic or manual/automatic transmission having a number of selectable gear ratios. A propeller shaft, or tailshaft, 56 extends from transmission 54, and a vehicle speed sensor 58 is preferably connected thereto. Vehicle speed sensor 58 is connected to input IN5 of control computer 30 via signal path 60 and is operable to sense tailshaft rotational speed and provide a vehicle speed signal to control computer 30 via signal path 60 corresponding thereto. Vehicle speed sensor 58 is preferably a variable reluctance sensor, although the present invention contemplates that sensor 58 may be any known sensor operatively associated with any suitable vehicle component to provide a vehicle speed signal to control computer 30 via signal path 60 indicative of vehicle speed.

As is particularly well known in the tractor truck industry, transmission 54 may typically include a separate microprocessor-based auxiliary computer 62 connected to a communications port JCOM of control computer 30 via a communications bus 64. Preferably, communications bus or datalink 64 is an SAE (Society of Automotive Engineers) J1939 two-wire bus and operates in accordance with the technical specifications set forth in the SAE J1939 bus industry standard. According to the SAE J1939 industry bus standard, control computer 30 and auxiliary computer 62 are operable to send and receive information relating to engine, vehicle and/or transmission operation. Thus, all information available on datalink 64 is available not only to control computer 12 but to auxiliary computer 62 as well. Those skilled in the art will therefore recognize that auxiliary computer 62 may alternatively be operable to compute some or all of the engine fueling information discussed above, and provide such information to control computer 30 for controlling fuel system 44.

As shown in phantom in FIG. 2, system 15 may optionally include a two-way wireless communication system 68 having an antenna 70 connected thereto, wherein system 68 is connected to a communications port COMM of control computer 30 (or alternatively to auxiliary computer 62) via signal path 72. As will be discussed in greater detail hereinafter, communications system 68 may be used to communicate data with another computer system. In one embodiment, communications system 68 is a cellular telephone transceiver operable to transmit/receive data from/to control computer 30 (and/or auxiliary computer 62) to/from a remote computer. Alternatively, communications system 68 may be an RF transceiver or a satellite communications transceiver operable as described with respect to the cellular telephone transceiver embodiment.

Figure 3:
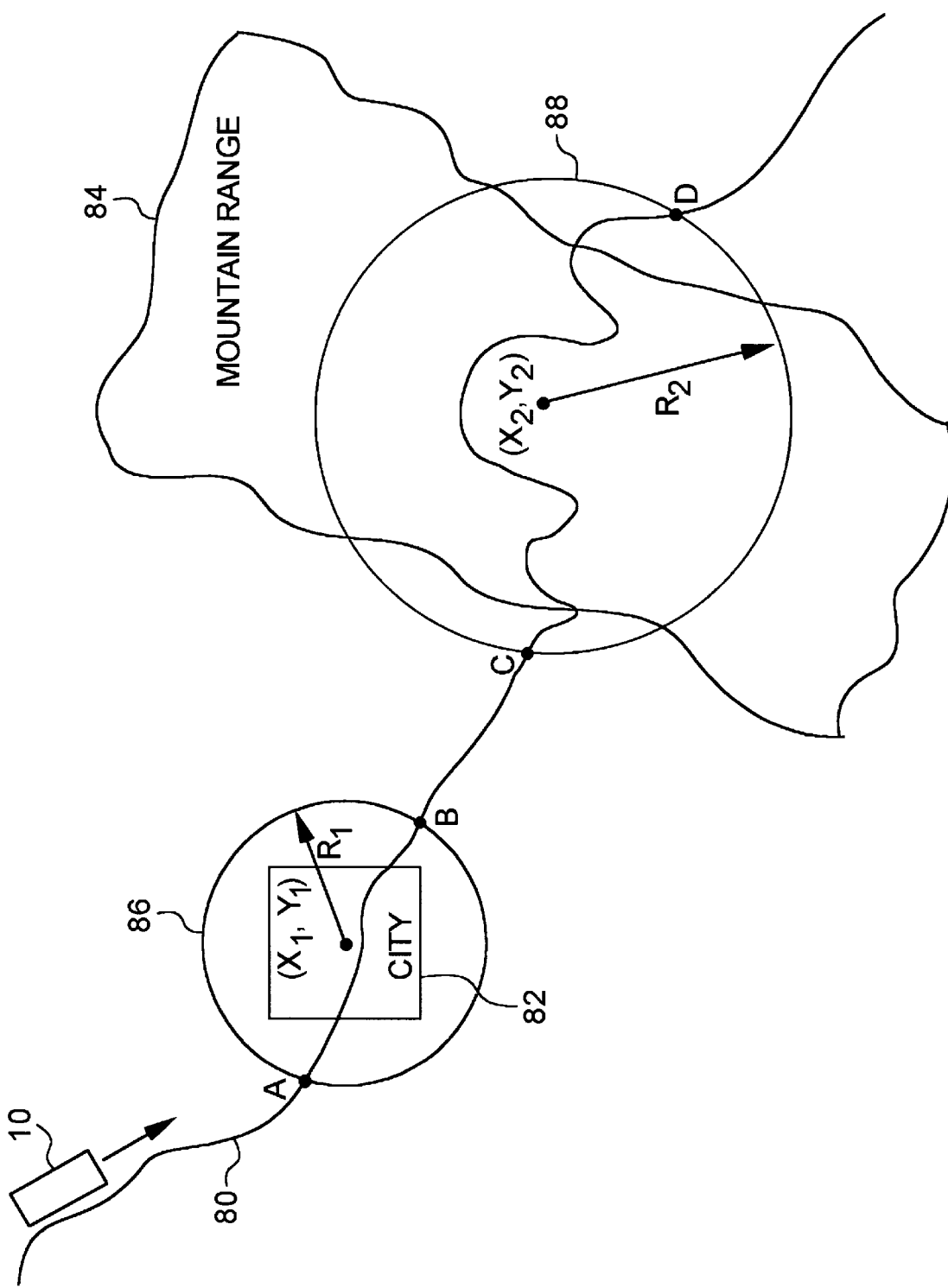
FIG. 3 is a diagrammatic illustration of a road extending through geographical areas having differing engine fueling strategies associated therewith, in accordance with the present invention.

Referring now to FIG. 3, operation of system 15, in accordance with one embodiment of the present invention, will be described in detail. FIG. 3 illustrates an example geographical map having a road 80 extending through a city 82 and a mountain range 84, with vehicle 10 (including system 15 of FIG. 2) traveling there along. In the example shown, an urban geographical region or area 86 surrounds the city 82, a hilly geographical region or area 88, i.e. a geographical area in which road 80 includes inclined road grades, surrounds the mountain range 84, and all other geographical areas through which road 80 passes define rural areas. In accordance with the present invention, system 15 is preferably operable to fuel engine 46 according to a low emissions engine fueling map whenever the vehicle 10 is operating in an urban area, to fuel engine 46 according to a fuel economy engine fueling map whenever the vehicle 10 is operating in a rural area, and to fuel engine 46 according to a high engine output engine fueling map whenever the vehicle 10 is operating in an area having inclined road grades. In the example map of FIG. 3, system 15 is thus operable to fuel engine 46 according to a low emissions engine fueling map as long as the vehicle 10 traveling along the road 80 is between points A and B of geographical area 86, to fuel engine 46 according to a high engine output engine fueling map as long as the vehicle 10 is between points C and D of geographical area 88, and to fuel engine 46 according to a fuel economy engine fueling map as long as the vehicle 10 is outside of geographical areas 86 and 88.

In carrying out the above-described operation, system 15 preferably includes a number of engine fueling maps within memory 66, wherein the number of engine fueling maps includes at least one low emissions engine fueling map, at least one fuel economy engine fueling map and at least one high engine output engine fueling map. Memory 66 further preferably includes maps, tables or mathematical functions of geographical areas or regions with engine fueling map indicators associated therewith. It will be appreciated by those skilled in the art that any known technique may be used to partition geographical territories into the various geographical regions or areas of interest for purposes of the present invention. For example, in accordance with one preferred embodiment of the present invention, geographical regions or areas corresponding to low emissions areas and high engine output areas, such as areas 86 and 88 of FIG. 3, are defined as circles having predefined center point geographical coordinates and predefined radii, and all areas outside of such geographical circles correspond to fuel economy areas. Thus, geographical area 86 (low emissions area) has a geographical center point of $(X_1,Y_1)$ and a radius of $R_1$, and geographical area 88 (high engine output area) has a geographical center point of $(X_2,Y_2)$ and a radius of $R_2$. It will be understood, however, that other geometric shapes, as well as local, national or international borders, could be used to define the geographical regions or areas of interest, and/or that geographical areas corresponding to fuel economy areas could alternatively be defined by area boundaries.

A number of known techniques exist for determining whether the present vehicle position is located within (or outside of) the boundaries defined by the geographical regions or areas of interest, and any one or more of such known techniques may be used for purposes of the present invention. For example, in accordance with one embodiment of the present invention, memory 66 preferably includes one or more geographical engine calibration tables including at least the latitudinal and longitudinal coordinates and radii of each geographical circle of interest along with a particular one of the number of available engine fueling maps corresponding thereto. Table 1 illustrates an example of one such table for the geographical territory shown in FIG. 3, although it is to be understood that the present invention contemplates providing the information shown therein in other forms, such as a mathematical equation, for example.

TABLE 1

GEOGRAPHICAL ENGINE CALIBRATION TABLE

| Latitude | Longitude | Radius | Engine Fueling Map |
|---|---|---|---|
| $X_1$ | $Y_1$ | $R_1$ | Low Emissions |
| $X_2$ | $Y_2$ | $R_2$ | High Engine Output |

Figure 4:
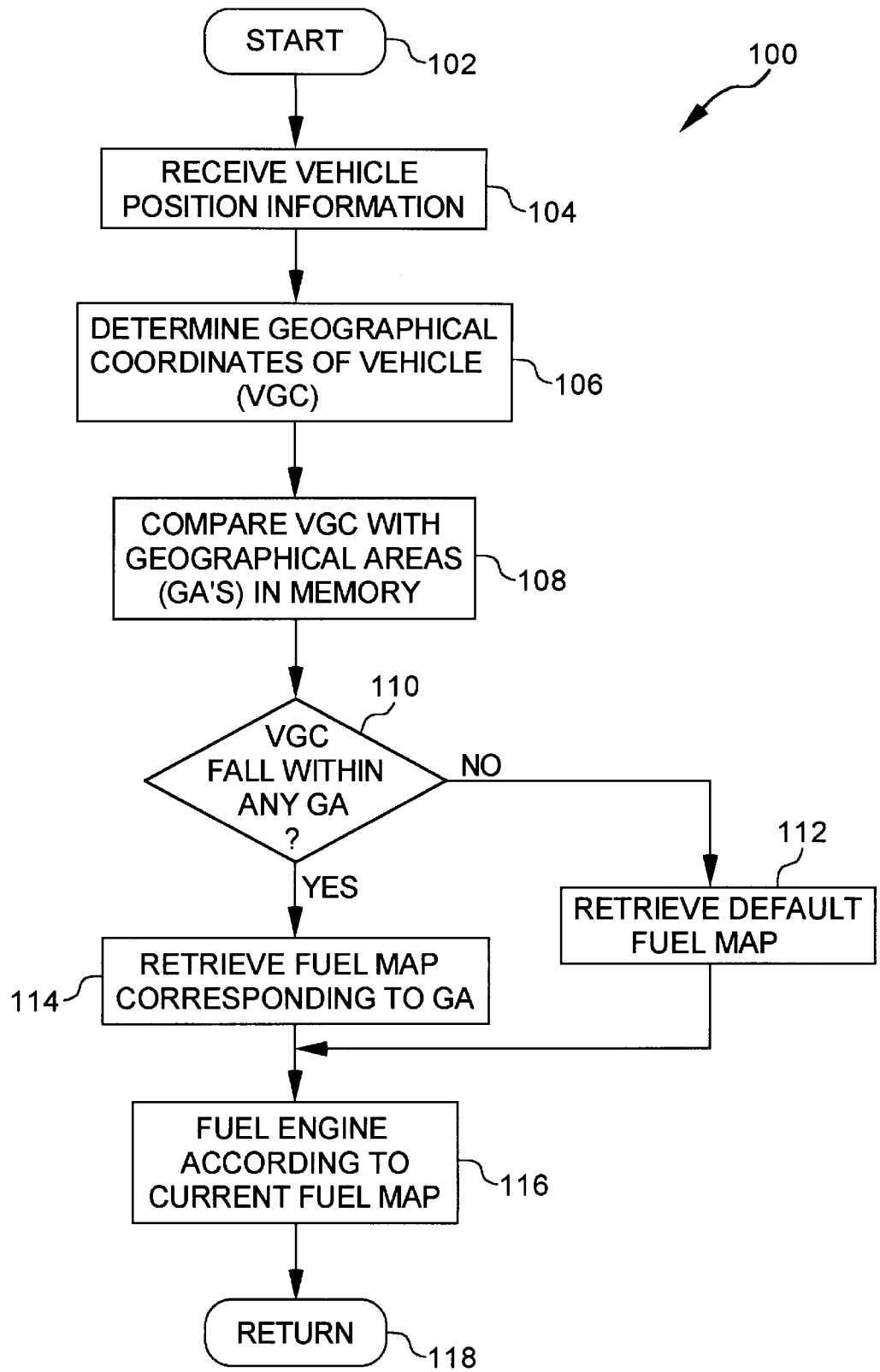
FIG. 4 is a flowchart illustrating one preferred embodiment of a software algorithm for controlling engine fueling according to vehicle location, in accordance with yet another aspect of the present invention.

Referring now to FIG. 4, a flowchart is shown illustrating one preferred embodiment of a software algorithm executable by control computer 30 (or auxiliary control computer 62) for selecting appropriate engine fueling maps based on vehicle location. The algorithm 100 begins at step 102 and at step 104, vehicle position signal receiver 20 receives vehicle position information in accordance with any of the radio signal techniques described hereinabove. Thereafter at step 106, control computer 30 determines the present vehicle geographical coordinates (VGC). In accordance with one preferred mode of operation of system 15, vehicle position receiver 20 is operable to continuously receive GPS or other such radio signals as described hereinabove. Receiver 20 may include circuitry for decoding such signals, in which case receiver 20 is operable at step 106 to periodically or continuously pass latitudinal and longitudinal (and optionally altitudinal and time) coordinate data to control computer 30 corresponding to present vehicle geographical coordinates (VGC), or receiver 20 may alternatively pass the received radio information to control computer 30 in which case control computer 30 is operable at step 106 to decode such information into the vehicle geographical coordinate (VGC) data.

In either case, algorithm execution continues from step 106 at step 108 where control computer 30 is operable to compare the present vehicle geographic coordinates (VGC) with the data stored in memory 66 relating to the geographical regions or areas (GA) of interest. As discussed hereinabove, many techniques are known and can be accordingly used to carry out such a comparison in step 108, although if a Geographical Engine Calibration Table such as Table 1 is used, control computer 30 preferably determines whether any of the distances between the present vehicle location coordinates and any of the geographical circle center coordinates are less than or equal to the corresponding circle radius values.

Algorithm execution continues from step 108 at step 110 where control computer 30 tests whether the present vehicle geographic coordinates (VGC) fall within any of the geographic regions or areas (GA) of interest, as a result of the comparisons of step 108. If not, then algorithm execution continues at step 112 where control computer 30 retrieves a default fuel map from memory 66. In accordance with the partitioning of the geographic territory illustrated in Table 1, if the current vehicle location does not fall within any of the geographic circles of interest, then the vehicle is presumed to be operating in a rural area and the default engine fueling map is therefore a known fuel economy engine fueling map. Algorithm execution continues from step 112 at step 116.

If, at step 110, control computer 30 determines that the vehicle 10 is presently located within one of the geographic regions or areas (GA) of interest, control computer 30 retrieves an engine fueling map from memory 66 appropriate for the geographical region or area of interest at step 114. For example, with reference to Table 1, if control computer 30 determines at step 110 that the vehicle 10 is presently located within area 86 (FIG. 3), then control computer 30 retrieves, at step 114, a known low emissions engine fueling map. If, however, control computer 30 determines at step 110 that the vehicle 10 is presently located within area 88 (FIG. 3), then control computer 30 retrieves, at step 114, a known high engine output engine fueling map. In one embodiment of the present invention, the high engine output engine fueling map is a high engine output power engine fueling map, while in an alternative embodiment, the high engine output engine fueling map is a high engine torque engine fueling map. In any case, algorithm execution continues from either of steps 112 or 114 at step 116 where control computer 30 is operable to fuel the engine 46, as discussed hereinabove, according to the fueling map retrieved in either of steps 112 or 114. Algorithm execution continues from step 116 at step 118 where algorithm execution returns to its calling routine (or alternatively routes back to step 104).

Figure 5:
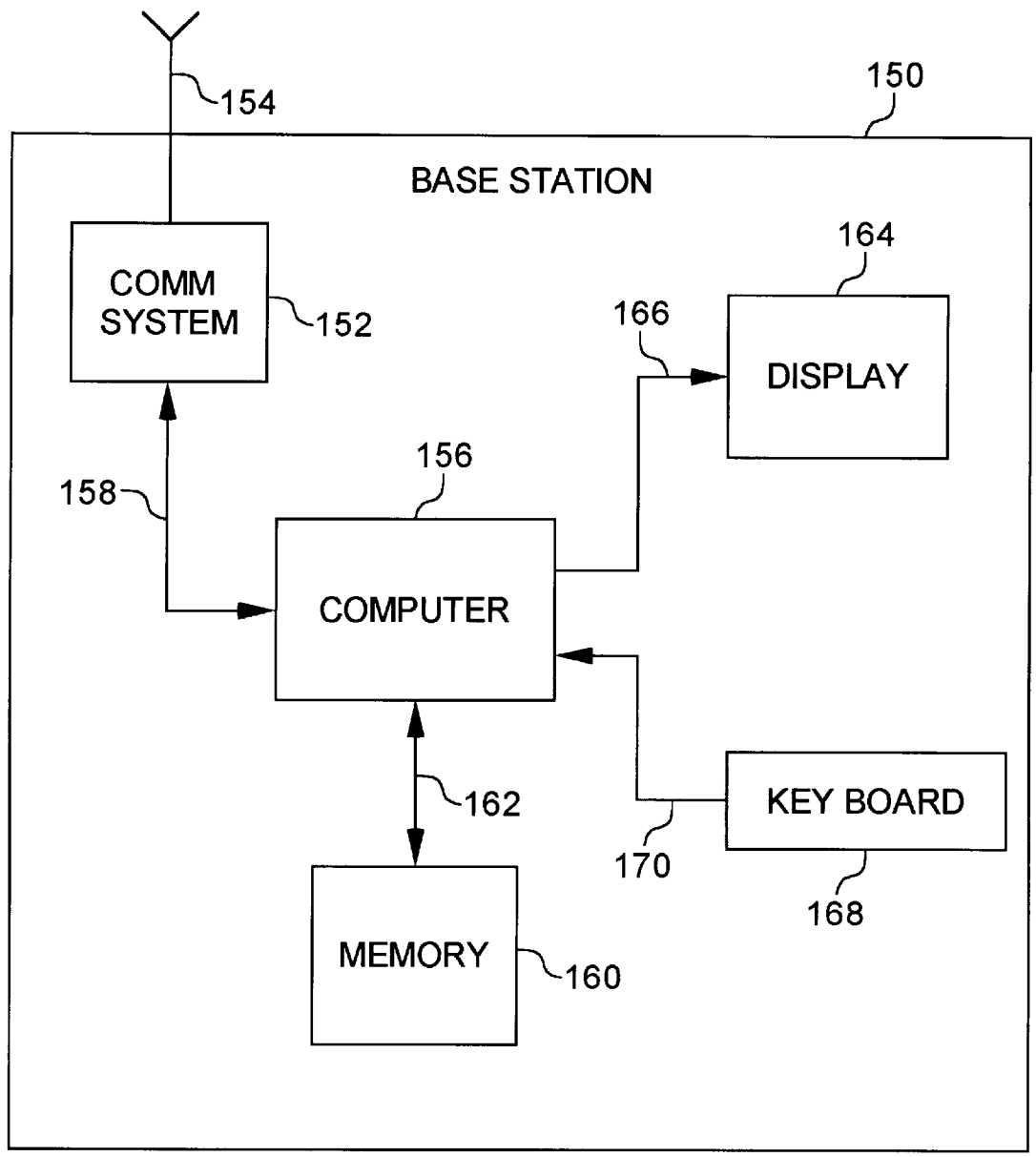
FIG. 5 is a diagrammatic illustration of one preferred embodiment of a base station for communicating with a mobile vehicle in accordance with an alternate embodiment of the engine control system of the present invention.

Referring now to FIG. 5, one embodiment of a base station 150, in accordance with another aspect of the present invention, is shown. Base station 150 is preferably a fixed position station having a control computer 156 connected to a communications system 152 via signal path 158, wherein communications system 152 is also connected to an antenna 154. As with optional communications system 68 illustrated in FIG. 2, communications system 152 may be a cellular telephone transceiver, a radio frequency transceiver or a satellite communications transceiver, although it should be understood that the two communications systems 68 and 152 must be compatible in their types of communication technology to thereby permit control computer 30 (or auxiliary control computer 62) to communicate with control computer 156 via systems 68 and 152. Base station 150 further includes a memory unit 160 connected to control computer 156 via signal path 162, wherein memory unit may be internal to computer 156 or may comprise a known diskette memory or CD ROM memory, for example. Station 150 preferably further includes a display unit 164 connected to computer 156 via signal path 166 and a keyboard or other known user input means 168 connected to computer 56 via signal path 170.

If system 15 is equipped with optional communications system 68, system 15 may, in an alternative embodiment of the present invention, receive some or all of the vehicle geographical coordinate (VGC), geographical region or area of interest (GA) information and/or engine fueling rate map information from a remote computer such as base station control computer 156. In accordance with one alternative embodiment of the present invention utilizing base station 150, control computer 30 (or auxiliary control computer 62) is operable to determine the vehicle geographical coordinates (VGC) as discussed hereinabove with respect to steps 104 and 106 of algorithm 100, and provide such data to control computer 156 of base station 150. In so doing, control computer 30 is operable to provide the vehicle geographic coordinate data to communications transceiver 68 in a known manner, wherein transceiver 68 is operable under the direction of either control computer 30 or control computer 156 to transmit such data to communications transceiver 152 of base station 150. The vehicle geographic coordinate data received by transceiver 152 is then passed to control computer 156, wherein control computer 156 is operable as discussed hereinabove to carry out either steps 108–114 or alternatively only steps 108–110, of algorithm 100. In either case, the geographical regions or areas (GA) and/or engine fueling maps in memory may be contained within computer memory 160 or may alternatively be contained within an external memory device such as a diskette or CD ROM. Alternatively, control computer 30 may simply pass the radio signal information from vehicle position receiver 20 directly to the base station control computer 156 so that control computer 156 is operable to additionally carry out step 106 of algorithm 100.

If control computer 156 is programmed to carry out all of steps 108–114, control computer 156 is operable to provide data relating to an appropriate fueling map to communications transceiver 152. If, on the other hand, control computer 156 is programmed to carry out only steps 108–110, control computer 156 is operable to provide data relating to which of the plurality of engine fueling maps within memory 66 to retrieve. In either case, transceiver 152 is operable, under the direction of either control computer 156 or control computer 30, to transmit the data provided thereto to transceiver 68 of system 15. Such data received by transceiver 68 is passed to control computer 30 (or auxiliary control computer 62) and, if such data represents an engine fueling map, control computer 30 (or auxiliary computer 62) is operable to carry out step 116 of algorithm 116 by fueling the engine 46 according to the engine fueling map data. If, on the other hand, such data represents an engine fueling map indicator, control computer 30 (or auxiliary computer 156) is operable to carry out steps 112, or 114 and step 116 of algorithm 100 by first retrieving an appropriate engine fueling map from memory 66 according to the engine fueling map indicator provided thereto by control computer 156, and then fueling the engine 46 according to the selected engine fueling map.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected. For example, if system 15 includes the optional communications transceiver 68, the base station computer 156 may be used to monitor vehicle travel and load memory 66 with a new set of geographical regions or areas of interest (GA's) when the vehicle enters a new geographical territory, such as new county, state, country or the like.

What is claimed is:

1. A system for controlling fueling of an internal combustion engine of a vehicle according to vehicle location, comprising:

a receiver associated with a vehicle for receiving radio signals relating to vehicle location;

a fueling system responsive to a fueling signal to provide fuel to an internal combustion engine of said vehicle;

means responsive to said radio signals relating to vehicle location for determining a geographical location of said vehicle;

means responsive to said geographical location of said vehicle for determining an engine fueling map corresponding to said geographical location of said vehicle; and a control computer providing said fueling signal to said fueling system according to said engine fueling map.

2. The system of claim 1 further including a memory unit having a number of different engine fueling maps stored therein;

and wherein said means for determining an engine fueling map is responsive to said geographical location of said vehicle to retrieve from said memory unit an appropriate one of said number of different engine fueling maps corresponding to said geographical location of said vehicle.

3. The system of claim 2 wherein said number of different engine fueling maps includes a low emissions engine fueling map for fueling said engine in a low exhaust emissions mode of operation.

4. The system of claim 3 wherein said low emissions engine fueling map corresponds to an urban geographical area.

5. The system of claim 2 wherein said number of different engine fueling maps includes a fuel economic engine fueling map for fueling said engine in a fuel economic mode of operation.

6. The system of claim 5 wherein said fuel economic engine fueling map corresponds to a rural geographical area.

7. The system of claim 2 wherein said number of different engine fueling maps includes a high output engine fueling map for fueling said engine in one of a high engine output power and a high engine output torque mode of operation.

8. The system of claim 7 wherein said high output engine fueling map corresponds to a geographical area having inclined road grades.

9. The system of claim 1 wherein said control computer includes said means responsive to said radio signals relating to vehicle location for determining a geographical location of said vehicle.

10. The system of claim 9 wherein said control computer includes said means responsive to said geographical location of said vehicle for determining an engine fueling map corresponding to said geographical location of said vehicle.

11. The system of claim 9 further including:

a first communications transceiver associated wish said vehicle, said first communications transceiver responsive to first control signals provided thereto by said control computer to transmit a first number of communication signals corresponding to said geographical location of said vehicle;

a second communications transceiver located remote from said vehicle and operable to receive said first number of communication signals; and a base station computer connected to said second communications transceiver and operable to determine said geographical location of said vehicle from said first number of communication signals, said base station computer including said means responsive to said geographical location of said vehicle for determining an engine fueling map corresponding to said geographical location of said vehicle;

wherein said second transceiver is responsive to second control signals provided thereto by said base station computer to transmit a second number of communication signals corresponding to said engine fueling map;

and wherein said first communications transceiver is operable to receive said second number of communication signals, and said control computer is operable to determine said engine fueling map from said second number of communication signals.

12. The system of claim 11 wherein each of said first and second communication transceivers are one of a cellular telephone transceiver, an RF radio signal transceiver and a satellite communications transceiver.

13. The system of claim 1 further including:

a first communications transceiver associated with said vehicle, said first communications transceiver responsive to first control signals provided thereto by said control computer to transmit a first number of communication signals corresponding to said radio signals relating to vehicle location;

a second communications transceiver located remote from said vehicle and operable to receive said first number of communication signals; and a base station computer connected to said second communications transceiver and operable to determine said radio signals relating to vehicle location from said first number of communication signals, said base station computer including said means responsive to said radio signals relating to vehicle location for determining a geographical location of said vehicle and said means responsive to said geographical location of said vehicle for determining an engine fueling map corresponding to said geographical location of said vehicle;

wherein said second transceiver is responsive to second control signals provided thereto by said base station computer to transmit a second number of communication signals corresponding to said engine fueling map;

and wherein said first communications transceiver is operable to receive said second number of communication signals, and said control computer is operable to determine said engine fueling map from said second number of communication signals.

14. The system of claim 13 wherein each of said first and second communication transceivers are one of a cellular telephone transceiver, an RF radio signal transceiver and a satellite communications transceiver.

15. The system of claim 1 wherein said receiver is one of a GPS, GLONASS and LORAN-C receiver operable to receive one of GPS, GLONASS and LORAN-C radio signals respectively.

16. A system for controlling fueling of an internal combustion engine of a vehicle according to vehicle location, comprising:

a receiver associated with a vehicle for receiving radio signals relating to vehicle location;

a fueling system responsive to a fueling signal to provide fuel to an internal combustion engine of said vehicle;

a memory unit having a number of different engine fueling maps stored therein; and a control computer connected to said receiver, said fueling system and said memory unit, said control computer responsive to said radio signals relating to vehicle location to determine therefrom a geographical location of said vehicle, retrieve from said memory unit an appropriate one of said engine fueling maps corresponding to said geographical location of said vehicle, and provide said fueling signal to said fueling system according to said appropriate one of said number of engine fueling maps.

17. The system of claim 16 wherein said number of different engine fueling maps includes a low emissions engine fueling map for fueling said engine in a low exhaust emissions mode of operation;

and wherein said low emissions engine fueling map corresponds to an urban geographical area.

18. The system of claim 16 wherein said number of different engine fueling maps includes a fuel economic engine fueling map for fueling said engine in a fuel economic mode of operation;

and wherein said fuel economic engine fueling map corresponds to a rural geographical area.

19. The system of claim 16 wherein said number of different engine fueling maps includes a high output engine fueling map for fueling said engine in one of a high engine output power and a high engine output torque mode of operation;

and wherein said high output engine fueling map corresponds to a geographical area having inclined road grades.

20. The system of claim 16 wherein said receiver is one of a GPS, GLONASS and LORAN-C receiver operable to receive one of GPS, GLONASS and LORAN-C radio signals respectively.

21. A method of controlling fueling of an internal combustion engine according to vehicle location, comprising the steps of:

determining a geographical location of a vehicle having an internal combustion engine;

determining an appropriate engine fueling map corresponding to the geographical location of the vehicle; and fueling the engine according to the appropriate engine fueling map.

22. The method of claim 21 wherein said step of determining a geographical location of a vehicle having an internal combustion engine includes the steps of:

receiving radio signals relating to vehicle location; and processing the radio signals to determine therefrom the geographical location of the vehicle.

23. The method of claim 22 wherein the radio signals are one of GPS, GLONASS and LORAN-C radio signals.

24. The method of claim 21 wherein the step of determining an appropriate engine fueling map corresponding to the geographical location of the vehicle includes the steps of:

determining an appropriate one of a number of engine fueling modes corresponding to the geographical location; and retrieving from a memory unit an engine fueling map corresponding to the appropriate one of a number of engine fueling modes.

25. The method of claim 24 wherein the appropriate one of a number of different engine fueling modes is a low emissions engine fueling mode for fueling said engine in a low exhaust emissions mode of operation.

26. The system of claim 25 wherein the corresponding geographical location is an urban geographical area.

27. The method of claim 24 wherein the appropriate one of a number of different engine fueling modes is a fuel economic engine fueling mode for fueling said engine in a fuel economic mode of operation.

28. The system of claim 27 wherein the corresponding geographical location is a rural geographical area.

29. The method of claim 24 wherein the appropriate one of a number of different engine fueling modes is one of a high engine output power and a high engine output torque fueling mode for fueling the engine in one of a high engine output power and a high engine output torque mode of operation respectively.

30. The system of claim 29 wherein the corresponding geographical location is a geographical area having inclined road grades.

\* \* \* \* \*

UNITED STATES PATENT AND TRADEMARK OFFICE
CERTIFICATE OF CORRECTION

PATENT NO. : 5,983,156

DATED : Nov. 9, 1999

INVENTOR(S) :
Eric B. Andrews

It is certified that error appears in the above-identified patent and that said Letters Patent is hereby corrected as shown below:

Col. 10, line 65
replace "wish"
with --with--

Signed and Sealed this

Seventh Day of November, 2000

Attest:

Q. TODD DICKINSON

*Attesting Officer*                *Director of Patents and Trademarks*